United States Patent [19]  
Torggler et al.

[11] Patent Number: 4,497,976  
[45] Date of Patent: Feb. 5, 1985

[54] METHOD FOR EMITTING ADDITIONAL INFORMATION IN CONJUNCTION WITH MESSAGE SIGNALS TO BE TRANSMITTED OVER A DATA SWITCHING CENTER

[75] Inventors: Norbert Torggler, Munich; Dietmar Franz, Puchheim, both of Fed. Rep. of Germany

[73] Assignee: Siemens Aktiengesellschaft, Berlin & Munich, Fed. Rep. of Germany

[21] Appl. No.: 466,628

[22] Filed: Feb. 15, 1983

[30] Foreign Application Priority Data

Feb. 25, 1982 [DE] Fed. Rep. of Germany ....... 3206796

[51] Int. Cl.³ ............................................. H04L 13/08
[52] U.S. Cl. ........................................................ 178/3
[58] Field of Search .................... 178/3, 2 B, 2 R, 17.5

[56] References Cited  
U.S. PATENT DOCUMENTS 4,323,728 4/1982 Bergman et al. ....................... 178/3

FOREIGN PATENT DOCUMENTS 2912649 10/1980 Fed. Rep. of Germany .

Primary Examiner—Stafford D. Schreyer  
Attorney, Agent, or Firm—Hill, Van Santen, Steadman & Simpson

[57] ABSTRACT

Additional information is transmitted, in conjunction with message signals which are transmitted over a data switching center belonging to a public switched network. The data switching center is connected to teleprinter subscriber stations and teletex subscriber stations which are capable of transmitting and receiving message signals in accordance with different transmission procedures. The transmission of message signals between the subscriber stations occurs over at least one signal converter connected to the data switching center. After an occupation of the signal converter proceeding from a teleprinter subscriber station, the corresponding digital information are deposited in a memory of the signal converter by the data switching center upon each attempt to establish a connection from the signal converter to a teletex subscriber station. Under certain conditions, together with the message signal transmitted by the teleprinter subscriber station and contained in the signal converter, the additional information are emitted from the memory to the teletex subscriber station after a successful completion of a connection between the signal converter and the teletex subscriber station.

2 Claims, 2 Drawing Figures

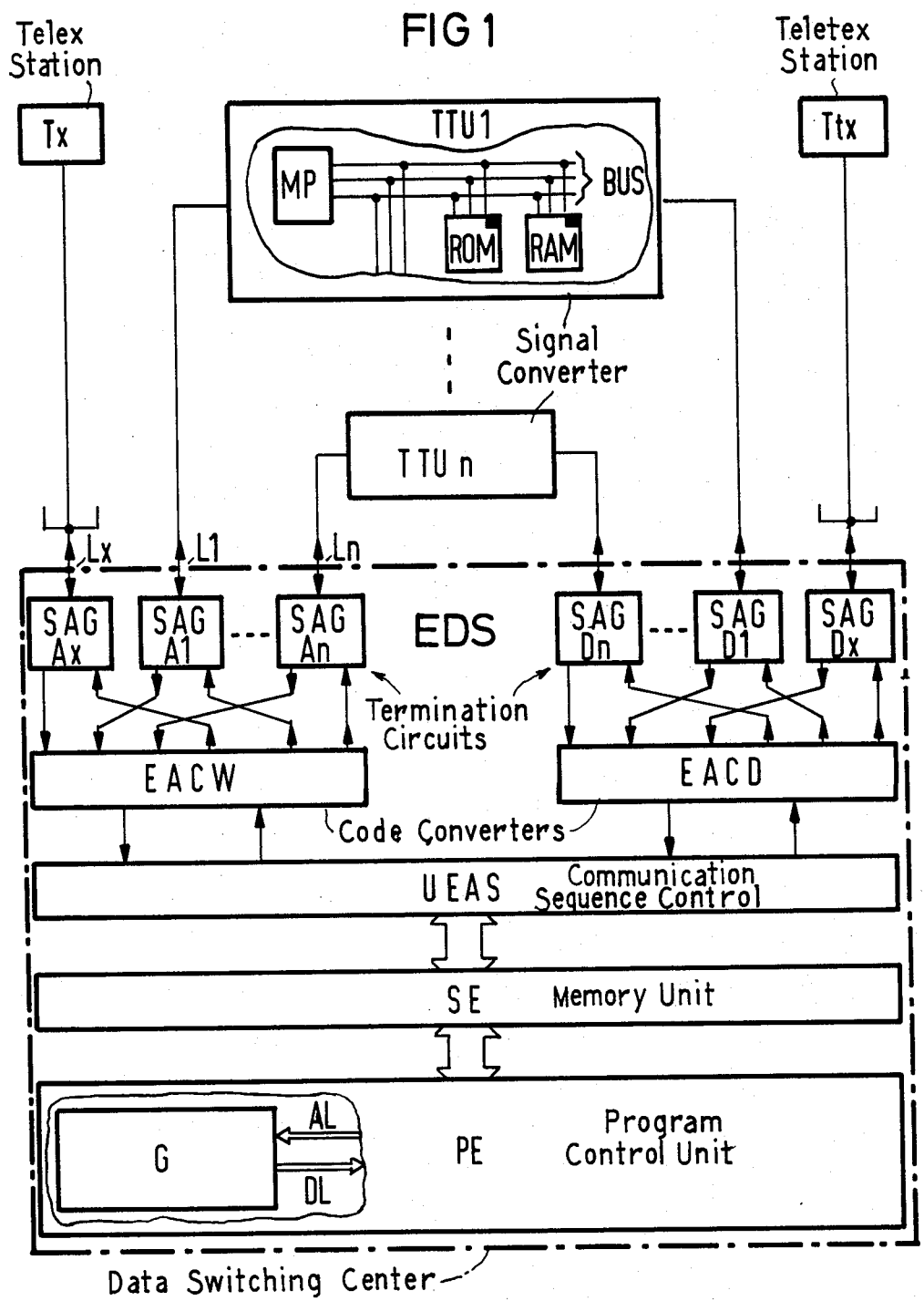

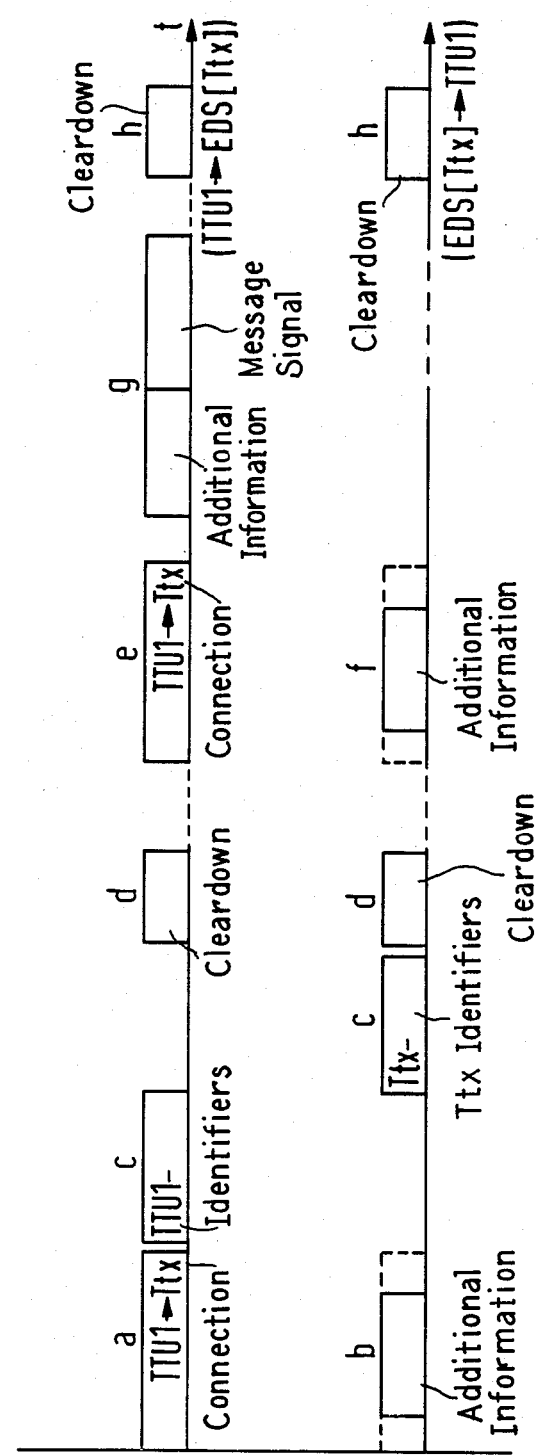

METHOD FOR EMITTING ADDITIONAL INFORMATION IN CONJUNCTION WITH MESSAGE SIGNALS TO BE TRANSMITTED OVER A DATA SWITCHING CENTER

BACKGROUND OF THE INVENTION

1. Field of the Invention

The present invention relates to a method for transmitting additional information, particularly specifics concerning date and time of day, in conjunction with message signals which are transmitted over a data switching center belonging to a public switched network and to which teleprinter subscriber stations are connected. The teleprinter subscriber stations are capable of transmitting and receiving message signals with a first transmission procedure. The data switching center is also connected to teletex subscriber stations which are capable of transmitting or receiving message signals with a second transmission procedure differing from the first transmission procedure. The transmission of message signals between teleprinter subscriber stations and teletex subscriber stations occurs over at least one signal converter which is also connected to the data switching center and which takes a conversion of the message signal supplied thereto with the first or second transmission procedure into message signals to be forwarded with the second or, respectively, first transmission procedure.

2. Description of the Prior Art

A circuit arrangement for the transmission of message signals between subscriber stations operating according to a first transmission procedure and subscriber stations operating in accordance with a second transmission procedure which differs from the first transmission procedure over a data switching center is already known in the art, for example from the U.S. Pat. No. 4,323,728, which is fully incorporated herein by this reference, and must be referred to as a signal converter. Given this known circuit arrangement, a plurality of converter devices is provided which is connected to termination circuits of a data switching center, the plurality belonging to two different groups of termination circuits. Such a converter is employed for the execution of the required conversion operations in the course of a connection between a subscriber station operating with the first transmission procedure and a subscriber station operating with the second transmission procedure.

It is provided in various known transmission procedures, for example in the teletex procedure, that, given an existing connection, indication of date and time of day are placed in front of the message signals to be transmitted, this being provided as additional information by the teletex subscriber stations. Given connections of telex subscriber stations to teletex subscriber stations, however, it has not heretofore been possible to transmit such additional information as required together with the message signals to be transmitted.

SUMMARY OF THE INVENTION

The object of the present invention is to provide a technique in which, in a relatively simple manner and without significantly loading the data switching center, additional information can be transmitted in conjunction with message signals over the data switching center from teleprinter subscriber stations to teletex subscriber stations.

With a method of the type generally set forth above, the object of the invention is achieved in that, after an occupation of the signal converter proceeding from the teleprinter subscriber station, the corresponding additional information are stepped into a memory of the signal converter by the data switching center upon every attempt to complete a connection from the signal converter to a teletex subscriber station and in that the additional information from the memory, if necessary with the message signals contained in the signal converter and transmitted by the teleprinter subscriber station, are forwarded to the teletex subscriber station after the completion of a connection between the signal converter and the teletex subscriber station. The invention offers the advantage that the actual transmission of the additional information is carried out by the signal converter so that no additional dynamic load occurs in the data switching center. Also deriving therefrom is the advantage that no devices offering the date and time of day are required in the signal converter for transmission date and time of day information as the additional information. A synchronization of devices offering the date and time of day in the data switching center and in the signal converter is therefore eliminated.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block diagram of a circuit arrangement for practicing the present invention; and FIG. 2 is a message diagram to aid in explaining the invention.

DESCRIPTION OF THE PREFERRED EMBODIMENT

As in the initially mentioned patent, FIG. 1 illustrates a known electronic data switching center EDS in an excerpted fashion. The data switching center EDS comprises, but is not limited to, a plurality of termination circuits SAG Ax, SAG A1—SAG An, belonging to a first group of termination circuits, termination circuits SAG Dx, SAG D1—SAG Dn belonging to a second group of termination circuits, input/output code converters EACW and EACD belonging to the individual groups of termination circuits, a communication sequence control UEAS, a memory unit SE and a program control unit PE. The termination circuits connected to the input/output code converter EACW serve the purpose of processing digital message signals alternating with respect to polarity. The termination circuits connected to the other input/output code converter EACD serve for processing digital message signals encompassing so-called bit groups, i.e. a respective plurality of bits, for example, 8 bits, which are also referred to as envelopes.

Of the termination circuits illustrated in FIG. 1, some of the termination circuits processing polarity reversal are connected to subscriber stations which transmit and receive digital message signals in accordance with a first data transmission procedure. Let these subscriber stations be standard teleprinter or telex subscriber stations of which one is indicated on the drawing and referenced Tx. These telex subscriber stations operate in accordance with a data transmission rate of 50 Bd and upon use of the international telegraph alphabet No. 2, i.e.

with a start/stop data format. The telex subscriber station Tx is therefore connected to the termination circuit SAG Ax by way of a line Lx which is exploited, for example, in a half-duplex mode of operation. A multiple character entered on the line Lx is intended to indicate that a plurality of telex subscriber stations can also be connected to the appertaining termination circuit SAG Ax.

Connected to some of the termination circuits processing digital message signals in the form of bit groups or envelopes are subscriber stations which can serially transmit or receive data message signals in the form of bit groups or envelopes. These subscriber stations may be of the so-called office teleprinter stations which are also referred to as teletex subscriber stations. Such a teletex subscriber station is referenced Ttx. The teletex subscriber station is connected to the termination circuit SAG Dx. A multiple character entered in the appertaining connecting line is intended to indicate that a plurality of such teletex subscriber stations can also be connected to the appertaining termination circuit SAG Dx. Concerning the teletex subscriber station, it should be pointed out that the same, for example, can transmit and receive serially-occurring digital message signals corresponding to the international alphabet IA No. 5 having a data transmission rate of 2400 bit/s, in particular as synchronous data signals.

A plurality of signal converters TTU1—TTUn is connected to the data switching center EDS illustrated in FIG. 1. The structure of the signal converters has already been described in the initially-mentioned patent. It is therefore presumed as being well known in the art. The signal converter TTU1 illustrated in an excerpted fashion and comprising a microprocessor MP which is connected over a bus line arrangement BUS to a program memory ROM and to a main memory RAM for storing of information signals is connected both at the transmitting side and at the receiving side to the termination circuit SAG A1 over a line L1. In a corresponding manner, the signal converter TTUn is connected over the line Ln to the termination circuit SAG An. The appertaining signal converters are connected to the termination circuits SAG D1 and SAG Dn with further signal inputs/signal outputs. The signal converters receive the respective digital message signals to be converted in terms of the transmission procedure or, respectively, transmit the respectively converted digital message signals over the connecting lines. This means that the signal converters can convert the telex signals supplied thereto into digital signal reproducible in the teletex subscriber stations and convert digital message signals emitted by the teletex subscriber stations into telex signals.

The method of the present invention will now be explained in greater detail with reference to a circuit arrangement illustrated in FIG. 1.

For this purpose, the case should be considered, for example, that additional information in the form of current date and time of day are to be made available by the data switching center for the digital message signals which are to be transmitted from a telex subscriber station to a teletex subscriber station. Transmission in the reverse direction, namely transmission of digital message signals from a teletex subscriber station to a telex subscriber station are not considered since, given an existing connection, teletex subscriber stations already generally proceed the actual message signals with additional information in the form of date and time of day, since these have received the date and time of day indications from the data switching center in the course of establishing connections in a conventional manner.

For the above case, which shall be the only case considered, a connection is established to the teletex subscriber station Ttx extending from the telex subscriber station Tx. The communications between the telex subscriber station Tx and the data switching center EDS required for this purpose are carried out according to the criteria of subscriber signaling for telex subscriber stations. The dial information thereby transmitted in the course of the connection establishment extending from the telex subscriber station contain selection signals (physical access identifiers) from which it proceeds that a connection to a teletex subscriber station Ttx is desired, i.e. that a conversion of the transmission procedure is to be undertaken. The data switching center EDS tests for such selection signals. Given the presence of such selection signals, the data switching center EDS occupies a signal converter TTU1—TTUn which is idle up to this point. The signal converter TTU1 should, for example, be such an idle signal converter.

After the occupation of the signal converter TTU1, the data switching center EDS forwards the signaling information required for further connection establishment (for example dial information) over the line L1 to the signal converter TTU1. The forwarding of such signaling information occurs according to the criteria of an inter-exchange signaling for telex traffic.

After receiving the signaling information, the signal converter TTU1 checks as to whether the teletex subscriber station Ttx selected by the telex subscriber station Tx is available as a receiver. To this end, a connection is briefly established from the signal converter TTU1 over the termination groups SAG D1 and SAG Dx to the teletex subscriber station in accordance with the information a of FIG. 2. During this connection establishment phase, the digital switching center EDS supplies the signal converter TTU1 with information representing the date and time of day which serves as additional information since, given a telex transmission, these indications are not automatically transmitted proceeding from the telex subscriber station Tx and not matched to the actual time of entry into the teletex network, as indicated in the information b of FIG. 2.

Reserved in the main memory RAM of the signal converter TTU1 in the following description also referred to as memory) are memory cells in which the message signals to be transmitted under certain conditions after the connection is set up are intermediately stored for conversion into corresponding teletex characters. The date and time of day indications previously received from the signal converter TTU1 are likewise deposited in these reserved memory cells.

After the setup of the connection between the signal converter TTU1 and the teletex subscriber station Ttx, the date and time of day indications previously stored in the memory cells of the signal converter are forwarded to the teletex subscriber station. Also, following such transmission is an exchange of the identifiers of the signal converter TTU1 and the telex subscriber station Ttx (block c of FIG. 2). After this exchange of identifiers, which only serves to check the availability of the teletex subscriber station Ttx, this connection is at first again terminated (block d of FIG. 2). It should be pointed out in this regard that the communication required for establishing a connection between the signal converter TTU1 and the data switching center EDS or, respectively, between the data switching center EDS and the teletex subscriber station Ttx occurs in accordance with the criteria of the CCITT recommendation X.71 or, respectively, X.21.

Only after completion of the disconnection of the connection between the signal converter and the teletex subscriber station is the connection to the signal converter previously initiated by the telex subscriber station Tx finally established. Following this is a transmission of the message signals to be emitted proceeding from the telex subscriber station Tx to the signal converter.

The message signals (telex signals) received in this manner by the signal converter TTU1 are subsequently intermediately stored in the aforementioned, reserved memory cells.

After complete reception of the message signals previously transmitted proceeding from the telex subscriber station Tx, the signal converter TTU1 initiates the establishment of a renewed connection to the teletex subscriber station Ttx (block e of FIG. 2).

Given this connection setup, date and time of day indications are again supplied by the data switching center to the signal converter TTU1 and are deposited in the reserved memory cells in which the message signals transmitted from the telex subscriber station Tx had already been previously stored (block f of FIG. 2).

After a successful connection has been completed, the signal converter TTU1 communicates the date and time of day indications intermediately stored in the reserved memory cells, as well as the message signals intermediately stored therein, to the teletex subscriber station Ttx in accordance with the transmission procedure to be employed (block g of FIG. 2). Before the communication of these signals, moreover, a conversion of the data format, at least of the message signals, is also carried out.

After the communication of the message signals, including the date and time of day indications, the connections existing between the signal converter TTU1 and the telex subscriber station or, respectively, the teletex subscriber station are disconnected in a known manner in accordance with the criteria of the signaling procedures which may be used for this purpose (block h of FIG. 2).

It should also be mentioned that the date and time of day indications can be taken from a memory cell of the data switching center EDS (of the central program control unit PE). However, it is possible that the date and time of day indications are to be made available by a special generator G belonging, for example, to the central program control unit PE as illustrated in FIG. 1. The generator G is controlled by way of an address line arrangement AL and transmits the available date and time of day indications over a data line arrangement DL, in particular as serial information.

Although the transmission of date and time of day indications has been set forth above, it should be apparent that any desired additional information offered by the data switching center EDS can be transmitted, in accordance with the present invention, in conjunction with message signals which are to be transmitted over the data switching center EDS. Therefore, for example, consecutive numbers concerning the message signals or, respectively, telexes supplied proceeding from the teleprinter subscriber stations can also be supplied to the respective teletex subscriber station in the course of the aforementioned transmission of the message signals.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method of transmitting message signals between a teleprinter (i.e. telex) station which transmits and receives in accordance with a first transmission procedure and a teletex station which transmits and receives in accordance with a different, second transmission procedure, the method being of the type in which transmission occurs via at least one signal converter which comprises a memory and which converts received message signals of one transmission procedure into message signals of the other transmission procedure, and in which the signal converter is connected to a data switching center, the improvement therein comprising the steps of:

after occupation of the signal converter by the telex station and storage of message signals sent by the telex station in the memory of the signal converter, transmitting additional information from the data switching center to the signal converter; storing the additional information in the memory of the signal converter;

establishing a connection between the signal converter and the teletex station; and reading the stored message signals and additional information and transmitting the same to the teletex station.

2. The improved method of claim 1, and further comprising the step of:

generating signals representing the date and the time of day as the additional information.

* * * * *